Feb. 13, 1940.                W. RUDOLPH                2,190,124
                            AUTOMOBILE SIGNAL
                           Filed July 12, 1937           2 Sheets-Sheet 1
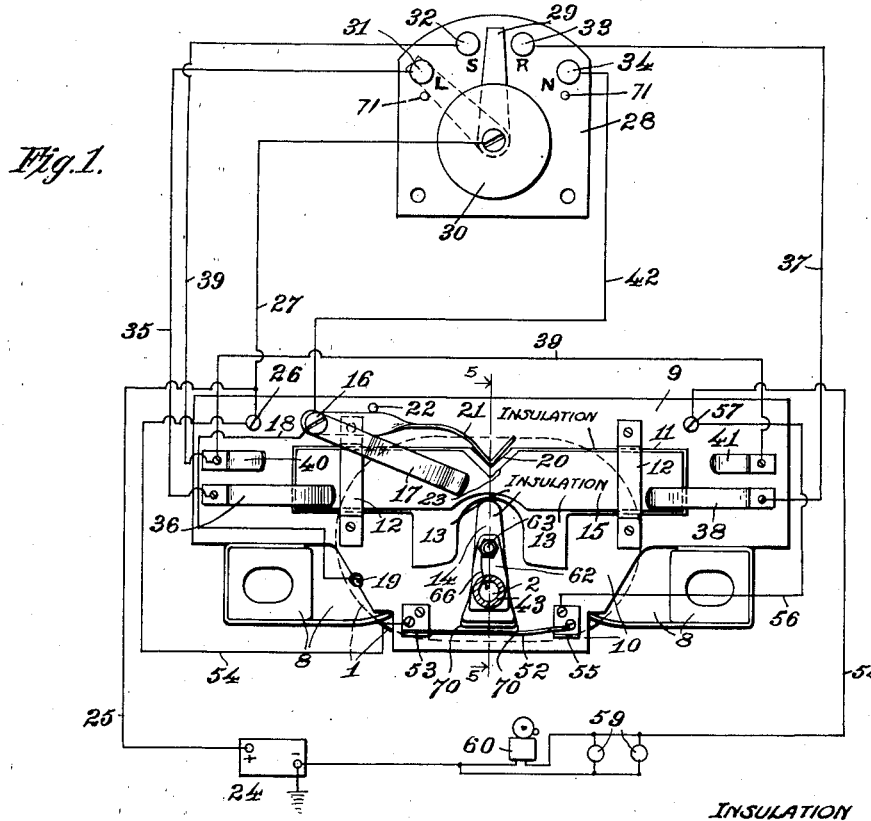
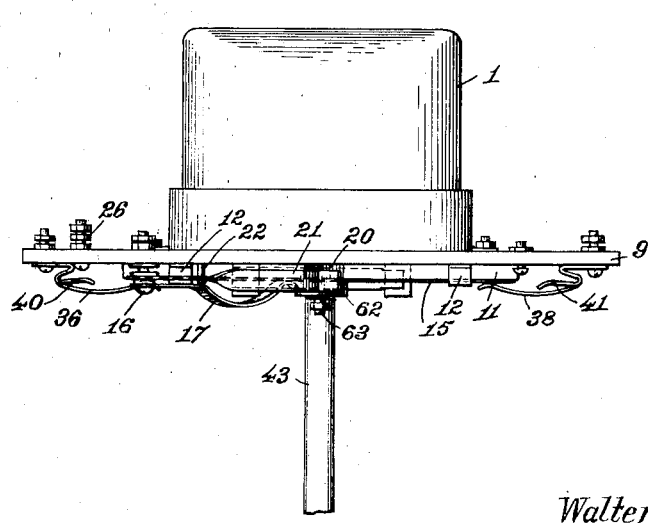
Inventor
Walter Rudolph
By Joshua R. H. Potts
Attorney Feb. 13, 1940. W. RUDOLPH 2,190,124
AUTOMOBILE SIGNAL
Filed July 12, 1937 2 Sheets-Sheet 2
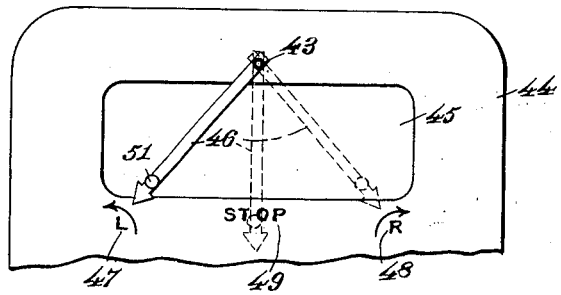
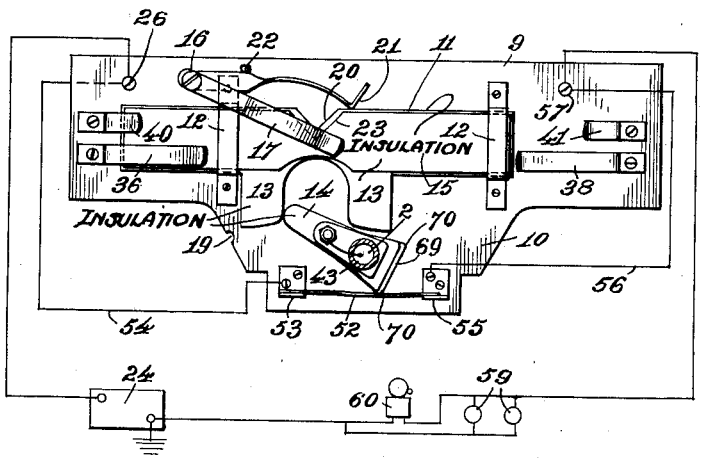
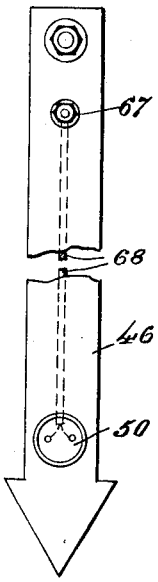
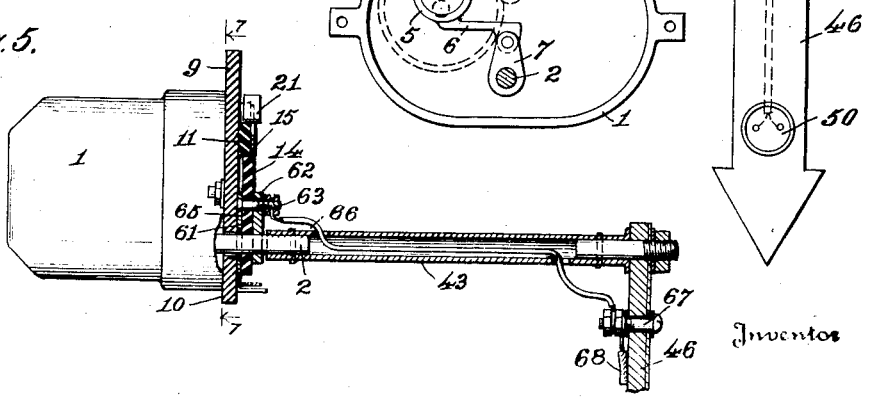
Walter Rudolph

UNITED STATES PATENT OFFICE 2,190,124

AUTOMOBILE SIGNAL

Walter Rudolph, Stroudsburg, Pa.

Application July 12, 1937, Serial No. 153,259

7 Claims. (Cl. 177—327)

My invention relates to signals, and particularly to an electric signal adapted to be applied to an automobile whereby the driver thereof may readily signal to the drivers in other cars and to pedestrians, his intentions as to operation of the car he is driving.

The object of my invention is to provide a signaling device of the character mentioned by means of which the driver may quickly, and without interference to the normal operation of the car, give suitable signals indicating his intention to turn right or left, or to stop the car he is driving. A further object of the invention is to provide a device of the character mentioned, whereby notice may be given to the drivers of following cars that conditions exist ahead which may require sudden action on the part of the driver. A further object of my invention is to provide a device of the character mentioned which may be applied to practically any automobile, and so arranged that the driver may at all times see that the device is properly operating without interfering with proper and continuous watching the traffic. Other objects will appear hereinafter.

In carrying out my invention I provide a swinging arm or pointer upon the rear of the automobile to indicate the intention of the driver as to his intended operation of the car as to turning or stopping. This arm is mounted upon an oscillatory motor driven shaft which projects through the rear wall of the car. Preferably I arrange this oscillatory shaft above the approximate center of the rear window of the car so that the signaling arm may be visible at all times to the driver who may readily see the same through the rear-view mirror arranged at the top of the windshield, the signal arm depending from said shaft and swinging across the rear window as indicated clearly in Fig. 3 of the drawings. The shaft may be oscillated by any preferred means, but I have found that I can adapt the motor of a windshield wiper to this use. Adjacent the oscillatory shaft is a compound circuit making and breaking device which is actuated by a cam arm fixed to said shaft. This cam also carries a contact element which actuates another make and break device whereby a light on the swinging signal arm is lit when the arm is moved to either "right" or "left" positions and is blinked as the arm is oscillated as will appear more fully hereinafter. At the front of the car, in a convenient position to the driver, is a switch mechanism whereby the driver can control the signaling device to indicate his intended operation of the car. This switch is provided with four contact points indicated respectively "left", "stop", "right", and "notice". Upon turning this switch to the switch point indicating right or left turn, the signal arm will be swung to the right or left accordingly, and stop in that position, the lamp on the signal arm being lit as it reaches signaling position. The illumination of the lamp is constant for these signals. When the switch is turned to the switch point "stop", the arm will swing to a vertical position, at which time it is not necessary to light the lamp on the signal arm as the usual stop light is lit upon actuation of the brake. Should the driver of the car notice ahead changing traffic conditions which would require unusual precaution, he places the switch arm on the switch point indicating "notice" which will cause the signal arm to oscillate and at the same time blink the light carried thereby. If preferred, red or other colored cowl lights may be provided, and also a bell or audible signal arranged under the hood which will operate each time the device is actuated so as to notify pedestrians or others who are in front of the car. It will be noted that the most urgent signals are those indicating a left turn, and those giving notice of traffic difficulties ahead; and for this reason I have placed the contacts for these signals at the extreme limits of the throw of the switch arm where stops are provided so that these signals can be operated quickly without danger of the switch arm passing beyond the contact points.

The circuit making and breaking device above mentioned includes a reciprocatory slidable contact member adjacent the oscillatory motor shaft and which is actuated by a cam member fixed to said oscillatory shaft. A contact member connected to a source of electric supply is in constant contact with the slidable contact member, and suitable fixed contacts are arranged adjacent the ends of said slidable contact some of which are in contact only at the end of each movement and others during part of the movement so that when the switch is thrown to give a certain signal, "right", "left", or "stop", the circuit to the motor is closed, but as soon as the signal arm, and with it the sliding contact, reaches the desired position, the circuit is broken and the motor stopped; and the circuit can be restored only upon further actuation of the switch. When the switch is moved to the contact "N" or "notice", the circuit to the motor is constant and not broken upon the reciprocation of the sliding contact, so that the signal arm is constantly oscillated. The cam arm also carries a contact which, at the end of each stroke, to right or left, engages a contact member closing the circuit to the lamp on the signal arm; and this contact member on the cam arm at such times also closes another circuit maker and breaker, thereby causing the circuit to be closed to the cowl lamps and audible signal above mentioned. My invention comprises various combinations and arrangements of parts for accomplishing the above results, all as will be fully described hereinafter and particularly pointed out in the claims.

My invention will be more readily understood by reference to the accompanying drawings forming a part of this specification and in which—

Fig. 1 is a diagram of the circuits employed in the device and illustrating the circuit make-and-break mechanism and associated parts in elevation, Fig. 2 is a plan view of the same with the wiring omitted to avoid confusion, Fig. 3 is a fragmentary view of the rear of an automobile equipped with my signaling device, Fig. 4 is an elevation of the parts illustrated in Fig. 1, shifted to display a certain signal, Fig. 5 is a section on the line 5—5 of Fig. 1, the motor casing being in elevation, Fig. 6 is an elevation of the signaling arm, partly broken away, Fig. 7 is a section on substantially line 7—7 of Fig. 5, and Fig. 8 is a side elevation of the cam for shifting the circuit make-and-break element.

Referring to the drawings, 1 indicates a motor casing and 2 a shaft oscillated by a motor therein. As above stated I have found the motor of a wind-shield wiper highly efficient for this purpose, with the exception that the shaft is normally oscillated too rapidly. In order to correct this when necessary, I provide reduced speed gearing 3 and upon one of the gears provide an eccentric wrist pin 4 upon which is arranged a strap 5 connected by a pitman 6 to a crank arm 7 fixed to the shaft 2, as illustrated in Fig. 7. By this arrangement, the gearing 3 may be designed to give the desired speed oscillation to the shaft 2. The motor casing is provided with the usual apertured lugs for mounting it in position.

Secured to the housing 1 and enclosing the gearing 3 and crank arm 7, with the connecting parts, is a plate 9 formed of suitable insulating material. This extends transversely of the device and has a depending portion 10 through which the shaft 2 extends. Slidably mounted upon the plate 9 is a reciprocatory contact member 11 which is held in place by a pair of straps 12 suitably attached to the member 9. This reciprocatory member 11 preferably comprises a longitudinal bar provided with a pair of spaced projections 13 extending to adjacent the shaft 2. Fixed to the shaft 2 is a cam arm 14 which, as the shaft oscillates, engages the projections 13 alternately and thereby moves or reciprocates the member 11. Preferably the body of the reciprocatory member 11 together with the projections 13 are formed of a single piece of insulating material, and fixed to the outer face of the body portion thereof is a plate 15 to serve as a conductor.

Fixed to the plate 9, as by a binding post 16 is a spring arm 17, the free end of which is in constant engagement with the plate 15. Extending from the binding post 16 to the motor (not shown) is a suitable conductor 18, 19 indicating an aperture in the casing and the edge of the depending portion 10 of plate 9 for the conductor. The oscillatory member 11 is provided in its edge with a notch 20 adapted to be engaged by a spring detent 21, when said member is in central position. For convenience this detent may be mounted upon the post 16 and is held in depressed position by a lug 22. The function of this detent will be more fully described hereinafter. It will be noted that the plate 15 is cut away as at 23 to avoid contact of the plate with the detent.

24 indicates a battery, preferably the usual battery of the car, and which is suitably grounded. From the battery 24 is a suitable conductor 25 to a battery post 26 on the plate 9. From the battery post 26 is a conductor 27 to a switch 28 located in a convenient position adjacent the driver's seat.

The switch 28 comprises a suitable base or support upon which is mounted the switch arm 29 provided with a knob 30 for turning the same, and four contact points 31, 32, 33 and 34 adjacent which, respectively, I prefer to arrange designating letters "L", "S", "R" and "N" which indicate respectively, "left turn", "stop", "right turn" and "notice". The battery lead line 27 is connected in the usual way to the switch arm 29. From the "left turn" contact point 31 is a conductor 35 leading to a spring contact arm 36; and from the "right turn" contact 33 is a conductor 37 leading to a similar arm 38. These spring arms 36 and 38 are fixed to the plate 9 and are in alignment with the movement of the reciprocating contact member. They are so proportioned and positioned that both of said arms are in contact with the plate 15 except at the extreme ends of the motion of the reciprocatory member. From the "stop" contact point 32 extends a connection 39 to a pair of shorter spring arms 40 and 41 respectively lying parallel with the arms 36 and 38, but so proportioned and arranged that they will contact the plate 15 only as the latter reaches the ends of its movement to the right or left respectively. From the switch point 34 ("notice") is a conductor 42 which extends to the binding post 16 and hence is in constant connection with the spring contact arm 17.

The shaft 2 extends a short distance beyond the plate 9—10, and fixed thereto is a tubular extension 43 which projects through the rear wall of the car 44, preferably at a central point above the rear window 45, as indicated in Fig. 3. Fixed to the end of the extension 43, in any desired manner, is a signal arm 46 preferably having a pointed end which, when the arm is appropriately moved, points to proper indicia provided on the rear of the car to indicate the intended movement of the car. To this end, the rear of the car is provided with indicia indicating left turn, right turn, and "Stop" as indicated in Fig. 3 at 47, 48 and 49 respectively. On the signal arm 46, preferably adjacent the free end is a lamp socket 50 for a signal lamp 51.

Fixed to the portion 10 of the plate 9 and upon the opposite side of the shaft 2 from the reciprocatory member 11 is a make-and-break device. This comprises a flexible contact arm 52 fixed to and supported by a member 53 fixed to the portion 10 and connected to the battery post 26 by a conductor 54. A fixed contact member 55, similar to the supporting member 53 is also secured to the plate portion 10 and is connected by a conductor 56 to a binding post 57 which is connected by a conductor 58 to the negative side of the battery 24. Cowl lights 59 and an audible signal 60 are arranged in parallel in the conductor 58, although it will be obvious that either one or both of these signals may be used as will appear more fully hereinafter.

The cam arm 14 on the shaft 2 is preferably formed of insulating material and is arranged between a pair of metallic plates 61 and 62 respectively, the three component parts being connected by a bolt 63 extending through the same.

A cotter pin 64 extending through the member 62 fixes the compound cam arm to the shaft 2. The bolt 63 is insulated from the plate 62 as indicated at 65 in Fig. 5, and a suitable conductor wire 66 extends through the tubular shaft extension and connects the bolt 63 to an insulated binding post 67 on the signal arm 46 adjacent the pivoted end thereof. From the post 67 a conductor 68 leads to the lamp socket 50.

The plate 61 is provided with an extension 69 projecting toward the flexible contact arm 52 and which is broadened to form spaced contact points 70 one of which engages said arm 52 when the cam arm is moved to right or left and thereby closes the circuit to the signal lamp 51 and also depresses the arm 52 into contact with the fixed contact member 55, thereby closing the circuit to the auxiliary signals 59 and 60.

The device above described may be readily installed upon practically any automobile with the signal arm 46 arranged as shown in Fig. 3 and as hereinbefore described; and the switch 28 arranged on the instrument board or in any position convenient to the driver. Should the driver intend to make a left turn, he throws the switch arm 29 to the left into engagement with the switch point 31. Current from the battery will then flow through the conductors 25 and 27 to the switch arm, thence from 31 through 35 to the spring contact arm 36, thence through the plate 15 of the reciprocatory member to the arm 17, thence through conductor 18 to the motor. This will cause the shaft to oscillate, and in doing so the cam arm 14 will engage one of the projections 13, moving the member 11 to the right, and thereby swinging the signal arm 46 to the left to point to the indicia on the rear of the car, indicating a left turn. As soon as the member 11 reaches the end of its movement, the plate 15 is moved beyond the contact arm 36 thereby breaking the circuit to the motor and leaving the signal arm in the desired position. At the same time, one of the contact points 70 engages the flexible arm 52 which is connected to the battery and current passes through the plate 61, bolt 63, conductors 66 and 68 to the signal lamp 50, thus illuminating the signal arm as it approaches its signaling position. This contact point 70 also depresses the spring arm 52 into contact with the fixed contact 55 thereby closing the circuit from the battery through 56 and 58 to cowl lamps 59. This gives notice to pedestrians or others in front of the car that the driver contemplates making a change in the movement of the car. If preferred, an audible signal such as a single stroke bell 60 may be provided on the car, as under the hood, for further attracting the attention of pedestrians, or others, to the contemplated change. To restore the signal arm to vertical position, the switch arm 29 is engaged with the switch point 32, thereby closing the circuit from the battery through 39 to the spring contact arm 41 which by the last mentioned operation has been brought into engagement with the plate 15. The current then passes through 15, arm 17, and conductor 18 to the motor. But as the reciprocatory member 11 is moved, the contact between 41 and plate 15 is broken and the reciprocatory member stops at the central position. This positioning of the reciprocatory member is assisted by the spring detent 21 engaging in the notch 20 which is sufficient to stop the member 11 in the proper position.

If a right turn is to be made the switch arm is moved to the switch point 33, and the current from the battery will pass from the same through 37 to the spring arm 38, thence through plate 15, arm 17 and conductor 18 to the motor, thereby repeating the operation described in regard to the left turn except that the reciprocatory member 11 is moved in the opposite direction by the cam arm 14, and the signal arm is swung to the right, as is obvious.

Frequently a driver notices ahead changing traffic conditions which make it impossible for him to decide at once whether to stop, turn left or turn right. At such times it is advisable to notify a following car of such condition so as to keep the driver on the alert to watch for a changing signal. In this event the switch arm 29 is thrown into engagement with the switch point 34. The current will then pass through the conductor 42 directly to conductor 18 to the motor and shaft 2 will be continuously oscillated without any breaking of the current as the member 11 is reciprocated. However, at the end of each swing of the signal arm, the points 70 will alternately engage the spring contact arm 52 thereby causing a blinking of the signal lamp 51 as the signal arm is oscillated. This also gives an intermittent operation to the signals 59 to 60. As soon as the driver decides upon the particular course to take he throws the switch arm to engage the proper switch point and a definite signal is given.

It is obvious that the most important signals and those which must be given quickly are the "notice" signal and the "left" turn signal. For this reason, I arrange the corresponding switch points 34 and 31 at the extreme end of the throw of the switch arm and provide stops 71 to prevent the arm from passing beyond the desired switch point. It is therefore obvious that in quickly giving either of these signals, the knob 30 may be quickly turned to the full extent without danger of failing to give the desired signal. The other signals mentioned may be more casually given and may therefore be arranged intermediate the ones just mentioned.

I claim:

1. In a signal device for motor cars, a motor, a shaft geared to said motor, a signal arm on said shaft to indicate the intended change in movement of the car, a switch adjacent the driver's seat for closing the circuit to the motor, a horizontally reciprocatory contact member adjacent the motor driven shaft for controlling the circuit to the motor, means on said shaft for reciprocating said reciprocatory contact, a lamp on said signal arm, a secondary signal, a normally open secondary signal circuit, circuit closing means for said secondary signal circuit arranged adjacent said shaft, and a pair of contact points on said shaft adapted to alternately engage the circuit closing device to close the same and simultaneously close the circuit to the lamp on the signal arm as the arm is oscillated, substantially as described.

2. In a signal device for motor cars, a motor, a shaft geared to said motor, a signal arm on said shaft to indicate the intended change in movement of the car, a switch adjacent the driver's seat for closing the circuit to the motor, a reciprocatory contact member adjacent the motor driven shaft for controlling the circuit to the motor, means on said shaft for reciprocating said sliding contact, a lamp on said signal arm, a secondary signal, a normally opened secondary signal circuit, a circuit closing means for said secondary circuit arranged adjacent said shaft and comprising a fixed contact and a spring arm and a pair of contact points on said shaft adapted to alternately engage said spring arm and simultaneously move the same into engagement with said fixed contact as the arm is oscillated, substantially as described.

3. In a signaling device for motor cars, an oscillatory motor driven shaft, a signal arm thereon to indicate intended change in the movement of the car, a switch adjacent the driver's seat for closing the circuit to the motor, a reciprocatory sliding contact member adjacent the motor driven shaft for controlling the circuit to the motor, said sliding member having a pair of spaced projections thereon, a cam arm on said oscillatory shaft adapted to engage said projections to move said sliding member, a secondary signal circuit, a secondary signal in said circuit, and means carried by the cam arm on the oscillatory shaft for intermittent closing and opening said secondary circuit when the shaft is oscillated, substantially as described.

4. In a signal device for motor cars, an oscillatory motor driven shaft, a signal arm thereon to indicate intended change in movement of the car, a source of electric supply, a switch adjacent the driver's seat for closing the circuit to the motor, said switch comprising a switch arm connected to said source of supply, and a plurality of contact points indicating and controlling selective signaling positions of said arm, a reciprocatory sliding contact member adjacent the motor shaft, means on the shaft for reciprocating said sliding member in unison with the oscillations of the shaft, a pair of fixed contact members adapted to normally engage the sliding contact member but disengaged therefrom respectively, at the opposite limits of movement of the sliding contact, conductors connecting said fixed contact members with respective contact points of the switch, a second pair of fixed contact members at opposite ends of the sliding member adapted to be engaged by said sliding member only at the end of the movement of the latter, the last said fixed contacts being together connected to a third contact point of the switch and a fixed contact arm in permanent engagement with the sliding contact and in circuit with the motor and a conductor from said fixed contact arm to a fourth point of the switch, and to the motor.

5. In a signal device for motor cars, an oscillatory motor driven shaft, a signal arm thereon to indicate intended change in movement of the car, a source of electric supply, a switch adjacent the driver's seat for closing the circuit to the motor, said switch comprising a switch arm connected to said source of supply, and a plurality of contact points indicating "Right", "Left", "Stop" and "Notice", a reciprocatory sliding contact member adjacent the motor shaft, means on the shaft for reciprocating said sliding member in unison with the oscillations of the shaft, a pair of fixed contact members adapted to normally engage the sliding contact member but disengaged therefrom respectively, at the opposite limits of movements of the sliding contact, conductors connecting said fixed contact members with contact points of the switch indicating "Right" and "Left" respectively, a second pair of fixed contact members at opposite ends of the sliding member adapted to be engaged by said sliding member only at the end of the movement of the latter, the last said fixed contacts being together connected to the contact point of the switch indicating "Stop", and a fixed contact arm in permanent engagement with the sliding contact and in circuit with the motor and a conductor from said fixed contact arm to a fourth point of the switch indicating "Notice", and to the motor.

6. In a signal device for motor cars, an oscillatory motor driven shaft, a signal arm thereon to indicate intended change in movement of the car, a source of electric supply, a switch adjacent the driver's seat for closing the circuit to the motor, said switch comprising a switch arm connected to said source of supply and a plurality of contact points indicating "Right", "Left", "Stop" and "Notice", a reciprocatory sliding contact member adjacent the motor shaft, means on the shaft for reciprocating said sliding member in unison with the oscillations of the shaft, a pair of fixed contact members adapted to normally engage the sliding contact member but disengaged therefrom respectively, at the opposite limits of movements of the sliding contact, conductors connecting said fixed contact members with contact points of the switch indicating "Right" and "Left" respectively, a second pair of fixed contact members at opposite ends of the sliding member adapted to be engaged by said sliding member only at the end of the movement of the latter, the last said fixed contacts being together connected to the contact point of the switch indicating "Stop", and a fixed contact arm in permanent engagement with the sliding contact and in circuit with the motor and a conductor from said fixed contact arm to a fourth point of the switch indicating "Notice", and to the motor, a notch in said sliding contact member and a spring detent engaging said notch when said sliding contact member is in substantially central position, substantially as described.

7. In a signal device for motor cars, an oscillatory motor driven shaft, a signal arm thereon to indicate intended change in movement of the car, a source of electric supply, a switch adjacent the driver's seat for closing the circuit to the motor, said switch comprising a switch arm connected to said source of supply, and a plurality of contact points indicating "Right", "Left", "Stop" and "Notice", a reciprocatory sliding contact member adjacent the motor shaft, means on the shaft for reciprocating said sliding member in unison with the oscillations of the shaft, a pair of fixed contact members adapted to normally engage the sliding contact member but disengaged therefrom respectively, at the opposite limits of movements of the sliding contact, conductors connecting said fixed contact members with contact points of the switch indicating "Right" and "Left" respectively, a second pair of fixed contact members at opposite ends of the sliding member adapted to be engaged by said sliding member only at the end of the movement of the latter, the last said fixed contacts being together connected to the contact point of the switch indicating "Stop", and a fixed contact arm in permanent engagement with the sliding contact and in circuit with the motor and a conductor from said fixed contact arm to a fourth point of the switch indicating "Notice", and to the motor, and a secondary signal circuit, a secondary signal in said circuit, and means carried by the cam arm on the oscillatory shaft for intermittently closing and opening said secondary circuit when the shaft is oscillated, substantially as described.

WALTER RUDOLPH.